United States Patent
Watanabe et al.

(10) Patent No.: US 8,914,211 B2
(45) Date of Patent: Dec. 16, 2014

(54) VEHICLE BRAKE CONTROL DEVICE

(75) Inventors: Takashi Watanabe, Nagoya (JP); Shinichiro Yukoku, Seto (JP); Yukio Tamada, Anjo (JP); Takahiro Shiraki, Toyota (JP)

(73) Assignees: Advics Co., Ltd., Kariya, Aichi-Pref. (JP); Toyota Jidosha Kabushiki Kaisha, Toyota-shi, Aichi-Ken (JP)

( * ) Notice: Subject to any disclaimer, the term of this patent is extended or adjusted under 35 U.S.C. 154(b) by 16 days.

(21) Appl. No.: 13/703,589

(22) PCT Filed: Jun. 15, 2011

(86) PCT No.: PCT/JP2011/063671
§ 371 (c)(1),
(2), (4) Date: Dec. 11, 2012

(87) PCT Pub. No.: WO2011/158855
PCT Pub. Date: Dec. 22, 2011

(65) Prior Publication Data
US 2013/0116904 A1 May 9, 2013

(30) Foreign Application Priority Data
Jun. 15, 2010 (JP) ................................ 2010-136257

(51) Int. Cl.
| | | |
|---|---|---|
| *B60T 7/12* | (2006.01) | |
| *B60T 13/66* | (2006.01) | |
| *B60T 13/68* | (2006.01) | |
| *B60T 8/48* | (2006.01) | |
| *F16D 65/18* | (2006.01) | |
| *B60T 13/58* | (2006.01) | |
| *F16D 65/74* | (2006.01) | |
| *B60T 13/74* | (2006.01) | |
| *F16D 123/00* | (2012.01) | |
| *F16D 121/02* | (2012.01) | |
| *F16D 125/48* | (2012.01) | |
| *F16D 121/18* | (2012.01) | |
| *F16D 125/40* | (2012.01) | |

(52) U.S. Cl.
CPC ............... B60T 7/12 (2013.01); B60T 13/662 (2013.01); B60T 13/686 (2013.01); *F16D 2123/00* (2013.01); B60T 8/4872 (2013.01); *F16D 2121/02* (2013.01); *F16D 2125/48* (2013.01); F16D 65/18 (2013.01); *F16D 2121/18* (2013.01); B60T 13/588 (2013.01); F16D 65/74 (2013.01); B60T 13/741 (2013.01); *F16D 2125/40* (2013.01)
USPC .......................................................... 701/70

(58) Field of Classification Search
None
See application file for complete search history.

(56) References Cited

U.S. PATENT DOCUMENTS 4,156,532 A * 5/1979 Kawaguchi et al. ........... 277/587
5,826,681 A * 10/1998 Kubo et al. ................... 188/71.8

(Continued)

FOREIGN PATENT DOCUMENTS

DE   10 2007 041 162 A1   3/2008
JP   05133429 A * 5/1993 ............... F16D 65/20

(Continued)

OTHER PUBLICATIONS

Machine Translation of JP 06249275 to Saito et al.*

(Continued)

*Primary Examiner* — John R Olszewski
*Assistant Examiner* — Navid Ziaeianmehdizadeh
(74) *Attorney, Agent, or Firm* — Buchanan Ingersoll & Rooney PC

(57) ABSTRACT

A vehicle brake control device is configured to correct deformation failure of a seal member and inhibit insufficient pullback of a pressing member caused by insufficient deformation of the seal member. Within a time period from a start of a lock operation to an end of the release operation, a W/C pressure is automatically increased and insufficient deformation of a seal member is corrected. It is thus possible to generate a large restoring force by the seal member when pulling back a piston, and the piston can be pulled back based on the restoring force. The piston is therefore sufficiently moved, and it is possible to inhibit insufficient piston pullback. Further, it is possible to cause a brake pad to be separated from a brake disc by a predetermined distance, and it is possible to inhibit a feeling of drag of a brake from being imparted to a driver.

10 Claims, 9 Drawing Sheets

(56) References Cited

U.S. PATENT DOCUMENTS

| | | | |
|---|---|---|---|
| 6,044,936 A * | 4/2000 | Matsumoto et al. | 188/72.4 |
| 6,244,393 B1 * | 6/2001 | Weidenweber et al. | 188/72.4 |
| 6,305,511 B1 * | 10/2001 | McCann et al. | 188/265 |
| 6,378,664 B1 * | 4/2002 | Warwick et al. | 188/72.3 |
| 6,481,543 B1 * | 11/2002 | Shaw et al. | 188/71.9 |
| 7,191,875 B2 * | 3/2007 | Kurimoto et al. | 188/72.4 |
| 8,448,754 B2 * | 5/2013 | Kubic et al. | 188/72.4 |
| 8,631,912 B2 * | 1/2014 | Langer et al. | 188/72.4 |
| 2002/0063022 A1 * | 5/2002 | Shaw et al. | 188/72.1 |
| 2003/0042084 A1 | 3/2003 | Kawase et al. | |
| 2004/0011610 A1 * | 1/2004 | Witzler et al. | 188/265 |
| 2005/0252732 A1 * | 11/2005 | Hashida et al. | 188/71.9 |
| 2006/0267402 A1 | 11/2006 | Leiter et al. | |
| 2007/0164602 A1 | 7/2007 | Haffelder et al. | |
| 2008/0053760 A1 | 3/2008 | Oikawa et al. | |
| 2008/0189019 A1 * | 8/2008 | Attayebi et al. | 701/70 |
| 2009/0255769 A1 * | 10/2009 | Kurita | 188/370 |
| 2010/0072811 A1 * | 3/2010 | Kondo et al. | 303/20 |
| 2011/0308898 A1 * | 12/2011 | Shiraki | 188/72.4 |

FOREIGN PATENT DOCUMENTS

| | | | | |
|---|---|---|---|---|
| JP | 06249275 A | * | 9/1994 | ............ F16D 65/20 |
| JP | 2003-065366 A | | 3/2003 | |
| JP | 2006-528312 A | | 12/2006 | |
| JP | 3726443 B2 | | 12/2006 | |
| JP | 2007-519568 A | | 7/2007 | |
| JP | 2010-241389 A | | 10/2010 | |

OTHER PUBLICATIONS

Machine Translation of JP 05133429 to Nakajima.*
Office Action (Notification of Reason of Rejection) dated Jan. 8, 2013, issued in corresponding Japanese Patent Application No. 2010-136257, and an English Translation of the Office Action. (3 pages).
International Search Report (PCT/ISA/210) issued on Jul. 26, 2011, by the Japanese Patent Office as the International Searching Authority for International Application No. PCT/JP2011/063671.
Office Action Issued on Sep. 18, 2014, by the German Patent Office in corresponding German Patent Application No. 11 2011 102 0341, and an English Translation of the Office Action. (10 pages).

* cited by examiner

INSUFFICIENT DEFORMATION

CORRECT DEFORMATION AMOUNT

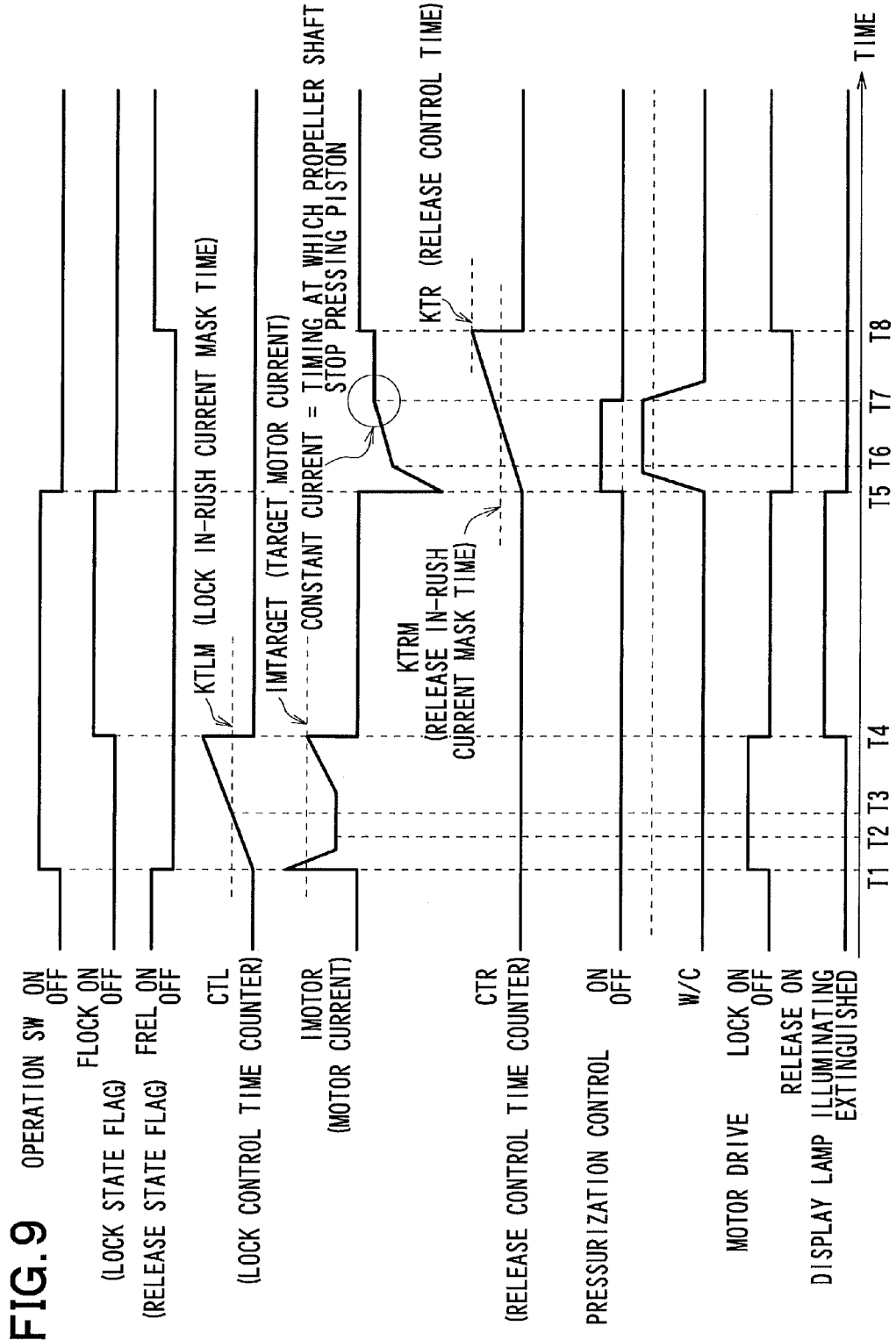

VEHICLE BRAKE CONTROL DEVICE

TECHNICAL FIELD

The present invention relates to a vehicle brake control device that, after locking a wheel by a parking brake and generating a braking force, performs release control to release the locked state, and is particularly appropriate for application in a case in which the braking force is generated by an electric parking brake (hereinafter referred to as an EPB (Electric parking brake)).

BACKGROUND ART

In related art, a parking brake is used to restrict movement of a vehicle when parking the vehicle, and the parking brake is, for example, a manual brake in which a brake cable is pulled by an operating lever and an operating force is thus transmitted to a brake mechanism, or an electric brake in which a rotational force of a motor is transmitted to a brake mechanism.

With the EPB that is the electric parking brake, at a time of locking, a motor is caused to rotate to a lock side (rotation in a positive direction) and a motor rotational force is transmitted to a brake mechanism (an actuator). At the same time, a motor drive is stopped in a state in which the braking force is generated. At a time of release, the motor is caused to rotate to a release side (rotation in a negative direction) and the braking force is thus released. The generation and release of the braking force is performed by performing this type of lock control and release control.

Note that generally, in a normal service brake, when the braking force is generated by hydraulic pressure, piston return is performed by deformation of a seal member, which is disposed between a piston (corresponding to a pressing member) inside a wheel cylinder (hereinafter referred to as a W/C) and the body. However, when the piston is moved by the EPB such that a brake pad is caused to come into contact with a brake disc, deformation of the seal member is insufficient because the hydraulic pressure is not applied to the seal member at the time of movement. As a result, a problem arises in which a pullback amount of the piston is insufficient when release control is performed.

In relation to this, PTL 1 discloses an electric brake system in which, when the piston of the W/C is pulled back, a return amount in a direction of separation from the disc is performed by operation of the electric brake, irrespective of the seal member, such that instability of the pullback amount can be inhibited.

CITATION LIST

Patent Literature

[PTL 1]
Japanese Patent No. 3726443

SUMMARY OF INVENTION

Technical Problem

However, the type of electric brake system disclosed in PTL 1 is a system in which a normal brake is also executed by an electric brake, so the demands of responsiveness, durability and tracking in response to operation etc. are high, and thus the structure is complex and extremely expensive. As a result, there is demand for a countermeasure against insufficient pullback amount of the piston caused by the seal member, without changing the structure of the known brake that uses the hydraulic pressure.

In light of the foregoing, it is an object of the present invention to correct deformation failure of a seal member and to inhibit insufficient return of a pressing member that is caused by the insufficient deformation of the seal member.

Solution to Problem

In order to achieve the above-described object, a first aspect of the invention is characterized in that a W/C is provided with a body having a hollow portion in which are housed a pressing member and a moving member, and at the same time, a seal member is provided between the body and the pressing member. Within a time period from a start of the lock operation to an end of the release operation, the electronic control means automatically increases, by using the brake fluid pressure adjustment means, a wheel cylinder pressure that is the brake fluid pressure inside the wheel cylinder, and performs deformation amount correction pressurization to correct an amount of deformation of the seal member by applying the increased fluid pressure to the seal member.

In this way, in the time period from the start of the lock operation to the end of the release operation, the brake fluid pressure adjustment means automatically increases the W/C pressure and applies the increased fluid pressure to the seal member, thus correcting insufficient deformation of the seal member. As a result, when the pressing member is pulled back at the time of the release operation, the seal member can generate a larger restoring force, and it is possible to pull back the pressing member based on the restoring force. Thus, the pressing member is moved sufficiently and it is possible to inhibit insufficient pullback of the pressing member.

A second aspect of the invention is characterized in that the electronic control means has pressure detection means for detecting the wheel cylinder pressure and, based on detection results of the pressure detection means, performs the deformation amount correction pressurization when the wheel cylinder pressure that is equal to or more than a pre-set necessary fluid pressure is not generated within a time period from the start of the lock operation to a start of the release operation.

In a case in which the insufficient deformation of the seal member is cancelled by a driver performing a brake operation, it is not necessary to correct the insufficient deformation of the seal member. For that reason, by providing the pressure detection means for detecting the W/C pressure, the deformation amount correction pressurization may be performed when, within the time period from the start of the lock operation to the start of the release operation, the W/C pressure that is equal to or more than the pre-set necessary fluid pressure is not being generated, based on detection results of the pressure detection means.

A third aspect of the invention is characterized in that the electronic control means has movement position estimation means for estimating a position after movement of the pressing member, and changes the necessary fluid pressure in accordance with the estimated position after movement.

A movement amount of the pressing member changes due to wear etc. of the friction material, and a degree of deformation insufficiency of the seal member changes accordingly. For that reason, by estimating the position after movement of the pressing member using the movement position estimation means and changing the necessary fluid pressure in accordance with the position after movement, it is possible to determine whether or not the deformation of the seal member is insufficient corresponding to the change in the movement amount of the pressing member at the time of locking.

A fourth aspect of the invention is characterized in that, the electronic control means sets the increased fluid pressure being result the deformation amount in accordance with the position after movement estimated by the movement position estimation means.

In this way, the increased fluid pressure of the W/C pressure being result of an automatic pressurization function of the service brake may be set in accordance with the position after movement of the pressing member estimated by the movement position estimation means. Specifically, if the necessary W/C pressure is changed in accordance with the change in the position after movement of the pressing member in order to move the pressing member to that position after movement, the deformation amount of the seal member is also changed correspondingly. Thus, by setting the increased fluid pressure of the W/C pressure in accordance with the position after movement of the pressing member, it is possible to appropriately set the increased fluid pressure necessary to correct the insufficient deformation of the seal member.

In this case, as in a fifth aspect of the invention, the electronic control means can set the increased fluid pressure being result of the deformation amount to a fluid pressure at which the friction material can be moved further from the position after movement of the pressing member at a time of the lock retention operation toward a side of contact with the friction-applied material.

In this way, it is possible to generate a condition that generates the W/C pressure equal to or more than the W/C pressure necessary to move the pressing member as far as causing the friction material to come into contact with the friction-applied material at a time of normal braking, and it is thus possible to reliably correct the insufficient deformation of the seal member.

A sixth aspect of the invention is characterized in that the electronic control means sets, as the increased fluid pressure, a pressure that is set in advance as a pressure that is capable of correcting a deformation failure of the seal member.

In this way, by calculating the fluid pressure that is capable of correcting the deformation failure of the seal member in advance, through experimentation or the like, the fluid pressure that is capable of correcting the deformation failure that has been calculated in advance may be generated as the W/C pressure. By calculating in advance the fluid pressure that is capable of correcting the deformation failure, it is not necessary to generate an unnecessarily large fluid pressure, and it is possible to reduce operation noise and operation time of the brake fluid pressure adjustment means.

A seventh aspect of the invention is characterized in that the electronic control means performs the deformation amount correction pressurization before a lock releasing in which the braking force generated by the parking brake is released by the release operation.

Until a lock release timing, the force applied from the pressing member to a contact surface of the seal member is the same direction as the deformation direction of the seal member, but after the lock release, that force is in the opposite direction to the direction of deformation of the seal member. As a result, by performing the deformation amount correction pressurization before the lock release, when the W/C pressure is automatically increased, it is possible to more reliably correct the insufficient deformation of the seal member.

In this case, as in an eighth aspect of the invention, if the deformation amount correction pressurization is executed by the electronic control means at the end of the lock operation, it becomes unnecessary to perform the automatic pressurization of the W/C pressure at the time of the release operation, and it is possible to more rapidly perform the lock release. Release delays can therefore be avoided.

Further, as in a ninth aspect of the invention, the deformation amount correction pressurization can be executed by the electronic control means before the lock release in the release operation. Then, because there are many cases in which the brake operation is performed by the driver at the time of the release operation, there are many cases in which it is not necessary to correct the insufficient deformation of the seal member, and, as in the second aspect of the invention, by detecting the W/C pressure using the pressure detection means and monitoring that the W/C pressure is equal to or more than the necessary fluid pressure, it is possible to reduce a frequency of operation of the brake fluid pressure adjustment means that is used to perform the automatic pressurization to correct the insufficient deformation of the seal member.

A tenth aspect of the invention is characterized in that the parking brake is an electric parking brake that has an electric drive source which uses the moving member to move the pressing member in accordance with a command from the electronic control means. When executing the deformation amount correction pressurization, the electronic control means, using the electric parking brake, uses the moving member to move the pressing member in a direction that causes the friction material to move to a side of contact with the friction-applied material.

By moving the pressing member simultaneously with the automatic pressurization in this way, it is possible to generate the force, on the contact surface of the seal member with the pressing member, in the direction in which the seal member is wished to be deformed. As a result, it is possible to more reliably correct the insufficient deformation of the seal member.

Note that the numerals inside brackets of each of the above-described means indicate a corresponding relationship with specific means noted in embodiments to be explained later.

BRIEF DESCRIPTION OF DRAWINGS

FIG. 9 is a timing chart when parking brake control processing is executed.

DESCRIPTION OF EMBODIMENTS

Figure 1:
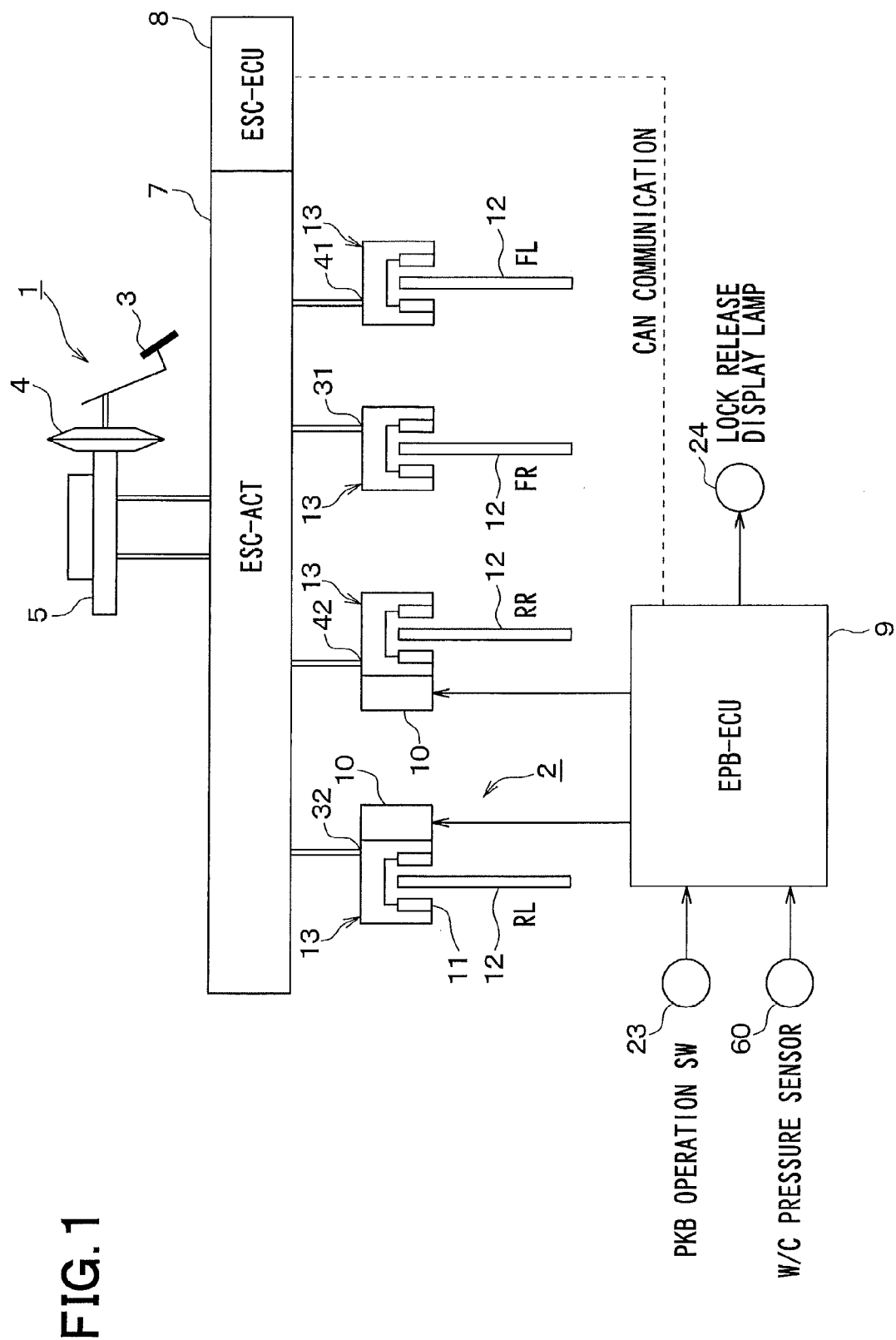
FIG. 1 is a schematic diagram showing an overall outline view of a vehicle brake system to which a parking brake control device according to a first embodiment of the present invention is applied.

Hereinafter, embodiments of the present invention will be explained based on the drawings. Note that, for each of the embodiments explained hereinafter, where portions are the same as or correspond to each other, the same reference numeral is allocated in the drawings.

First Embodiment

Figure 2:
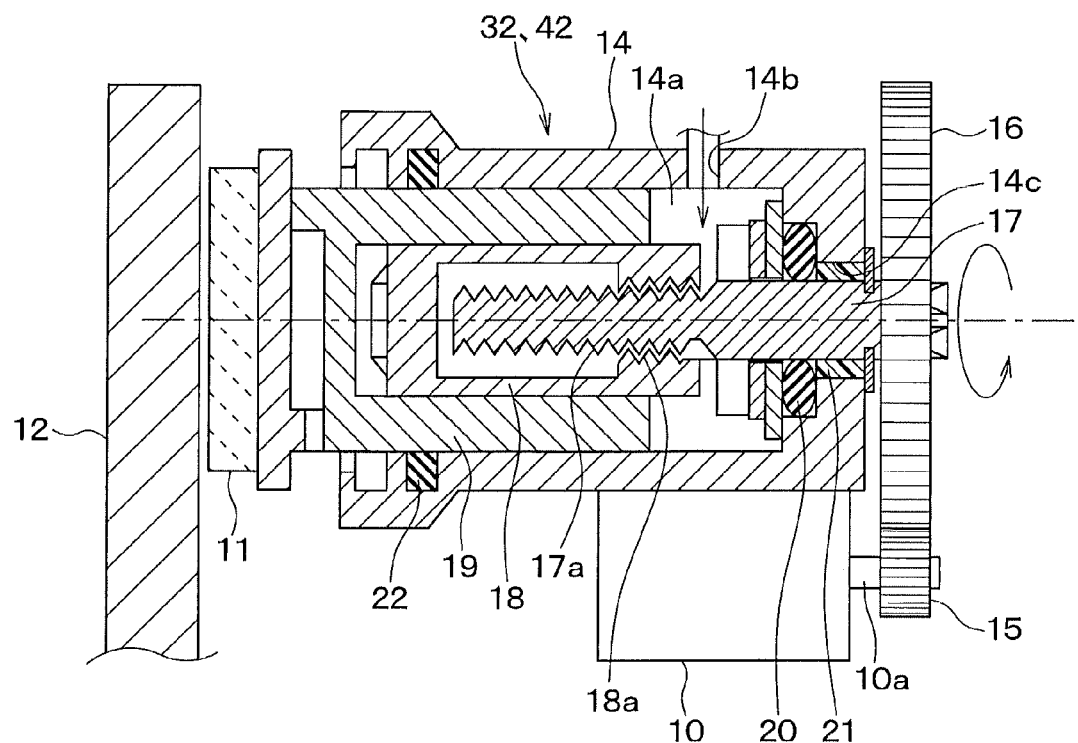
FIG. 2 is a cross-sectional schematic diagram of a brake mechanism of a rear wheel system that is provided in the brake system shown in FIG. 1.

A first embodiment of the present invention will be explained. In the present embodiment, a vehicle brake system is explained as an example, in which a disk brake type EPB is applied to a rear wheel system. FIG. 1 is a schematic diagram showing an overall outline of the vehicle brake system to which a brake control device according to the present embodiment is applied. Further, FIG. 2 is a cross-sectional schematic diagram of a brake mechanism of the rear wheel system, which is provided in the brake system. Hereinafter, the explanation will be made with reference to the drawings.

As shown in FIG. 1, the brake system is provided with a service brake 1, which generates a braking force based on a pedal force of a driver, and an EPB 2, which is used to restrict movement of a vehicle when parking the vehicle.

After the pedal force has been multiplied by a booster 4 in accordance with a depression of a brake pedal 3 by the driver, the service brake 1 generates, inside a master cylinder (hereinafter referred to as M/C) 5, a brake fluid pressure that corresponds to the multiplied pedal force, and generates a braking force by transmitting the brake fluid pressure to each of W/Cs 31, 32, 41 and 42, which are provided in each of wheel brake mechanisms. Further, an actuator 7 is provided between the M/C 5 and the W/Cs 31, 32, 41 and 42, the actuator 7 being brake fluid pressure adjustment means, and the braking force generated by the service brake 1 is adjusted and various controls (such as anti-skid control, for example) can be performed to improve the safety of the vehicle.

Each of the controls using the actuator 7 is executed by an ESC (Electronic Stability Control)-ECU 8. For example, a hydraulic circuit provided in the actuator 7 is controlled by outputting, from the ESC-ECU 8, a control current to control various control valves and pump drive motors provided in the actuator 7, thus controlling the W/C pressure that is transmitted to the W/Cs 31, 32, 41 and 42. A structure of the actuator 7 will be explained in more detail later.

Meanwhile, the EPB 2 is controlled by an EPB control device (hereinafter referred to as an EPB-ECU) 9, a motor 10 is driven by the EPB-ECU 9 and the braking force is generated by controlling the brake mechanism.

The brake mechanism is a mechanical structure that generates the braking force in the brake system of the present embodiment, and the brake mechanism of a front wheel system has a structure in which the braking force is generated by operation of the service brake 1, while the brake mechanism of the rear wheel system has a shared structure in which the braking force is generated with respect to operation of both the service brake 1 and the EPB 2. In contrast to the brake mechanism of the rear wheel system, the brake mechanism of the front wheel system is a known brake mechanism that is generally used, in which a mechanism to generate the braking force based on the operation of the EPB 2 is not included. An explanation thereof is therefore omitted here, and hereinafter, the brake mechanism of the rear wheel system will be explained.

In the brake mechanism of the rear wheel system, a brake pad 11 shown in FIG. 2, which is a friction material, is pressed not only when the service brake 1 is operated, but also when the EPB 2 is operated. By the brake pads 11 clamping a brake disc 12, which is a friction-applied material to which friction is applied, a frictional force is generated between the brake pads 11 and the brake disc 12, thus generating the braking force.

Specifically, the brake mechanism rotates the motor 10 that is directly fixed to a body 14 of the W/Cs 32 and 42, which push the brake pad 11, as shown in FIG. 2, inside each of calipers 13 shown in FIG. 1. Then, a spur gear 15 that is provided on a drive shaft 10a of the motor 10 is caused to rotate, and a rotational force of the motor 10 is transmitted to a spur gear 16 that meshes with the spur gear 15, thus causing the brake pad 11 to move, and generating the braking force by the EPB 2.

In addition to the W/Cs 32 and 42 and the brake pads 11, a part of an end surface of the brake disc 12 is housed inside the caliper 13, such that the brake disc 12 can be clamped by the brake pads 11. In the W/Cs 32 and 42, by introducing the brake fluid pressure, via a passage 14b inside a hollow portion 14a of the cylinder-shaped body 14, the W/C pressure is caused to be generated inside the hollow portion 14a, which is a brake fluid storage chamber. A rotating shaft 17, a propeller shaft 18 and a piston 19 etc. are provided inside the hollow portion 14a.

One end of the rotating shaft 17 is coupled to the spur gear 16 via an insertion hole 14c that is formed in the body 14, and when the spur gear 16 is caused to rotate, the rotating shaft 17 rotates in accordance with the rotation of the spur gear 16. A male screw groove 17a is formed on an outer peripheral surface of the rotating shaft 17, on the end of the rotating shaft 17 that is on the opposite side to the end of the rotating shaft 17 that is coupled to the spur gear 16. Meanwhile, the other end of the rotating shaft 17 is axially supported by being inserted into the insertion hole 14c. Specifically, a bearing 21 is provided along with an O ring 20 in the insertion hole 14c, and the other end of the rotating shaft 17 is axially supported by the bearing 21 while the brake fluid does not leak from between the rotating shaft 17 and an inner wall surface of the insertion hole 14c due to the O ring 20.

The propeller shaft 18 is formed as a hollow tubular member. A female screw groove 18a, which is engaged with the male screw groove 17a of the rotating shaft 17, is formed on an inner wall surface of the propeller shaft 18. The propeller shaft 18 is structured, for example, as a cylindrical column that is provided with a rotation prevention key, or as a polygonal column, such that, even if the rotating shaft 17 rotates, the propeller shaft 18 does not rotate centering around a center of rotation of the rotating shaft 17. For that reason, when the rotating shaft 17 is caused to rotate, due to the intermeshing of the male screw groove 17a and the female screw groove 18a, the rotational force of the rotating shaft 17 is converted to power that causes the propeller shaft 18 to move in the axial direction of the rotating shaft 17. When the driving of the motor 10 is stopped, the propeller shaft 18 stops in a same position due to the frictional force caused by the intermeshing of the male screw groove 17a and the female screw groove 18a, and if the driving of the motor 10 is stopped when a target braking force is reached, the propeller shaft 18 can be maintained in that position.

The piston 19 is disposed such that it surrounds an outer periphery of the propeller shaft 18, and is formed as a bottomed circular cylindrical member or polygonal cylindrical member. An outer peripheral surface of the piston 19 is disposed to be in contact with the inner wall surface of the hollow portion 14a formed in the body 14. The seal member 22 is provided on the inner wall surface of the body 14 so that there is no leakage of brake fluid between the outer peripheral surface of the piston 19 and the inner wall surface of the body 14, and a structure is realized in which the W/C pressure can be applied to an end face of the piston 19. The seal member 22 is a member that is used to generate a reactive force in order to pull back the piston 19 at a time of release control after lock control.

Further, so that the piston 19 is not caused to rotate centering around the center of rotation of the rotating shaft 17 even when the rotating shaft 17 rotates, when a rotation prevention key is provided on the propeller shaft 18, a key groove is provided on the piston 19 along which the key slides, and when the propeller shaft 18 is a polygonal column, the piston 19 has a polygonal cylindrical shape that corresponds to the propeller shaft 18.

The brake pad 11 is disposed on a leading end of the piston 19, and the brake pad 11 is caused to move in the left-right direction as seen in the drawings in accordance with the movement of the piston 19. Specifically, the piston 19 is structured such that it can move in the left direction as seen in the drawings in accordance with the movement of the propeller shaft 18, and can also move in the left direction independently of the propeller shaft 18 by the W/C pressure being applied to an end portion of the piston 19 (the end portion on the opposite side to the end portion on which the brake pad 11 is disposed). Then, when the propeller shaft 18 is in an initial position (a state before the motor 10 is caused to rotate), if it is a state in which the brake fluid pressure inside the hollow portion 14a is not applied (W/C pressure=0), the piston 19 is moved in the right direction as seen in the drawings due to a deformation (a retract function) of the seal member 22, and the brake pad 11 is caused to separate from the brake disc 12. Further, when the motor 10 is caused to rotate and the propeller shaft 18 is caused to move from the initial position in the left direction as seen in the drawings and the W/C pressure is 0, movement of the piston 19 in the right direction as seen in the drawings is restricted by the moved propeller shaft 18 and the brake pad 11 is held in that location.

In the brake mechanism structured in this manner, when the service brake 1 is operated, the piston 19 is caused to move in the left direction as seen in the drawings based on the W/C pressure that is generated by the operation of the service brake 1, and thus the brake pad 11 is pressed into the brake disc 12 and the braking force is generated. In addition, when the EPB 2 is operated, the motor 10 is driven and the spur gear 15 is thus caused to rotate. In line with this, the spur gear 16 and the rotating shaft 17 are caused to rotate, and thus, based on the intermeshing of the male screw groove 17a and the female screw groove 18a, the propeller shaft 18 is caused to move to the brake disc 12 side (in the left direction as seen in the drawings). As a result of this, the piston 19 is also caused to move in the same direction, the brake pad 11 is pressed into the brake disc 12 and the braking force is generated. Thus, the shared brake mechanism is possible in which the braking force is generated with respect to both the operation of the service brake 1 and the operation of the EPB 2.

Figure 3:
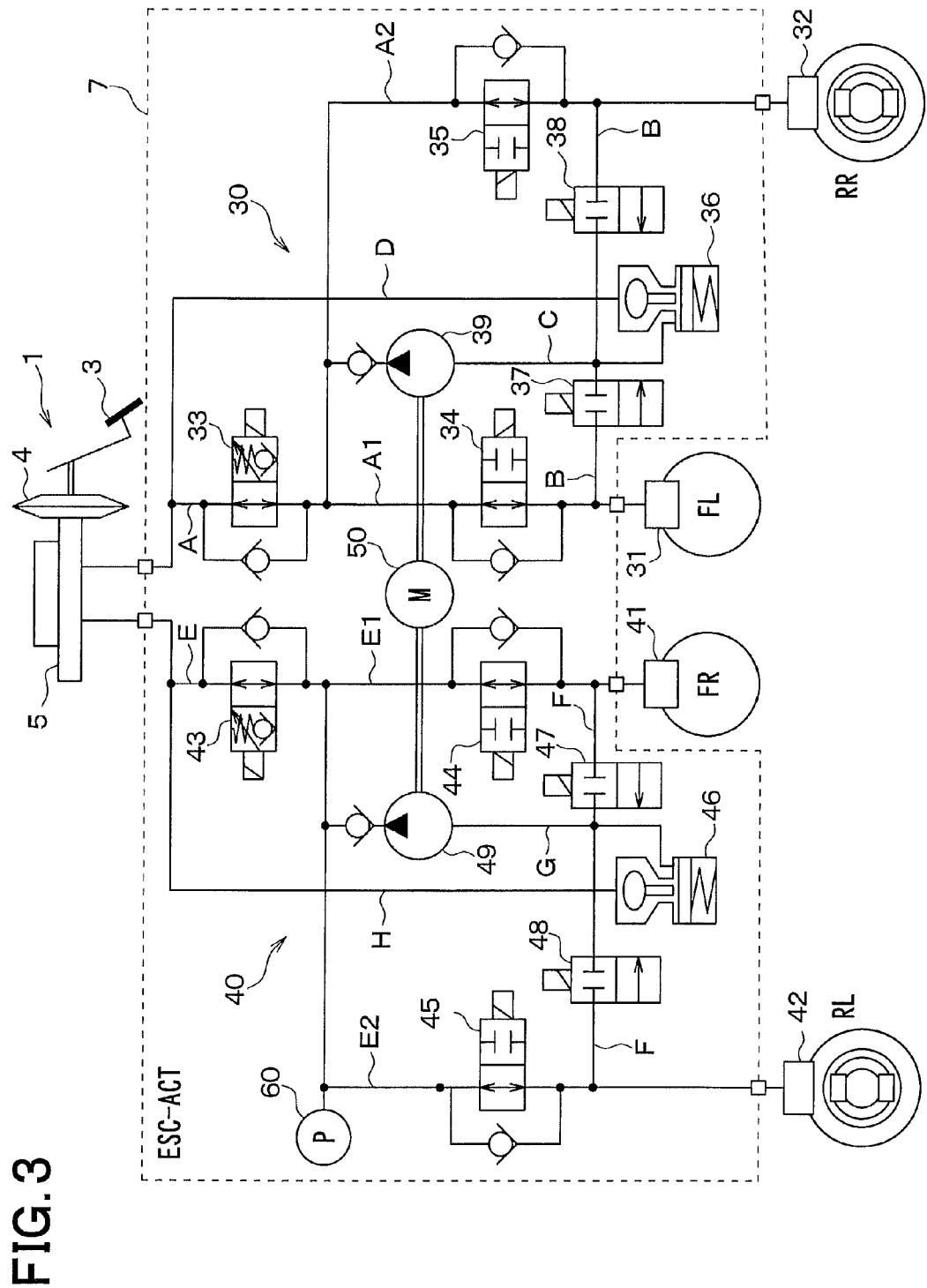
FIG. 3 is a diagram of a hydraulic circuit of the brake system showing a detailed structure of an actuator 7.

Next, FIG. 3 shows a hydraulic circuit diagram of the brake system, showing a detailed structure of the actuator 7. The structure of the actuator 7 will be explained in detail with reference to this drawing.

As shown in FIG. 3, first and second piping systems 30 and 40, which are respectively communicatively connected to a primary chamber and a secondary chamber of the M/C 5, are formed inside the actuator 7. The first piping system 30 controls the brake fluid pressure that is applied to a front left wheel FL and to a rear right wheel RR, while the second piping system 40 controls the brake fluid pressure that is applied to a front right wheel FR and a rear left wheel RL.

When the service braking force is generated, an M/C pressure that is generated in the M/C 5 is transmitted to the W/Cs 31, 32, 41 and 42 via the first piping system 30 and the secondary piping system 40. A pipeline A, which connects the primary chamber of the M/C 5 to the W/Cs 31 and 32, is provided in the first piping system 30. At the same time, a pipeline E, which connects the secondary chamber of the M/C 5 to the W/Cs 41 and 42, is provided in the second piping system 40, and the M/C pressure is transmitted to the W/Cs 31, 32, 41 and 42 via each of the pipelines A and E.

In addition, the pipelines A and E are provided with differential pressure control valves 33 and 43 that can perform control to a communication state and a differential pressure state. At a time of service braking when the driver operates the brake pedal 3, a valve position of the differential pressure control valves 33 and 43 is adjusted to a communication state, and when an electric current flows through a solenoid coil provided in the differential pressure control valves 33 and 43, the valve position is adjusted such that the larger the electric current value becomes, the larger the differential pressure state becomes.

When the differential pressure control valves 33 and 43 are in the differential pressure state, the brake fluid is allowed to flow only from the side of the W/Cs 31, 32, 41 and 42 to the M/C 5 side, only when the brake fluid pressure on the side of the W/Cs 31, 32, 41 and 42 becomes higher than the M/C pressure by a predetermined value or more. As a result, a state is constantly maintained in which the pressure on the side of the W/Cs 31, 32, 41 and 42 is higher, by the predetermined value, than the M/C 5 side.

Then, the pipelines A and E each divide into two pipelines A1, A2, E1 and E2 on the side of the W/Cs 31, 32, 41 and 42 that are further downstream than the differential pressure control valves 33 and 43. The pipelines A1 and E1 are provided with first pressure increase control valves 34 and 44 that control a pressure increase in the brake fluid pressure to the W/Cs 31 and 41, and the pipelines A2 and E2 are provided with second pressure increase control valves 35 and 45 that control the pressure increase in the brake fluid pressure to the W/Cs 32 and 42.

The first and second pressure increase control valves 34, 35, 44 and 45 are each formed of a two position solenoid valve that can control a communication state and a shut-off state. The first and second pressure increase control valves 34, 35, 44 and 45 are a normally open type valve and are controlled to be in the communication state when a control current to a solenoid coil provided in the first and second pressure increase control valves 34, 35, 44 and 45 is zero (when not energized), and to be in the shut-off state when the control current flows into the solenoid coil (when energized).

Between the first and second pressure increase control valves 34, 35, 44 and 45 and each of the W/Cs 31, 32, 41 and 42, the pipelines A and E are connected to pressure control reservoirs 36 and 46, via pipelines B and F that are pressure reduction pipelines. First and second pressure reduction control valves 37, 38, 47 and 48, which are two position solenoid valves that can be controlled to a communication or a shut-off state, are respectively arranged on the pipelines B and F. Then, the first and second pressure reduction control valves 37, 38, 47 and 48 are a normally closed type valve and are controlled to be in the shut-off state when a control current to a solenoid coil provided in the first and second pressure reduction control valves 37, 38, 47 and 48 is zero (when not energized), and to be in the communication state when the control current flows into the solenoid coil (when energized).

Pipelines C and G, which are reflux pipelines, are arranged between the pressure control reservoirs 36 and 46 and the pipelines A and E, which are the main pipelines. Self-suction pumps 39 and 49, which perform suction and discharge of the brake fluid from the pressure control reservoirs 36 and 46 to the M/C 5 side or to the side of the W/Cs 31, 32, 41 and 42 and which are driven by a motor 50, are provided in the pipelines C and G. The motor 50 is driven by controlling energization of a motor relay that is not shown in the drawings.

Further, pipelines D and H, which are ancillary pipelines, are provided between the pressure control reservoirs 36 and 46 and the M/C 5. Via the pipelines D and H, the pumps 39 and 49 suck the brake fluid from the M/C 5 and discharge the brake fluid into the pipelines A and E, thus supplying the brake fluid to the side of the W/Cs 31, 32, 41 and 42.

With the actuator 7 structured in this manner, by outputting the control current to control the various control valves 33 to 35, 37, 38, 43 to 45, 47 and 48 and the motor 50 that is used to drive the pumps, the ESC-ECU 8 controls the hydraulic circuit that is provided in the actuator 7. In this way, as anti-skid control, when a wheel slips at the time of braking, it is possible to inhibit wheel lock by performing pressure reduction, maintenance and pressurization of the W/C pressure. As skid prevention control, it is possible to automatically increase the W/C pressure of the wheel targeted for control and thus suppress a tendency to skid sideways (an understeer tendency or an oversteer tendency), so that turning can be performed on an ideal trajectory. The automatic pressurization function of the service brake 1 using the actuator 7 is used to correct a deformation failure of the seal member 2.

The EPB-ECU 9 is formed of a known microcomputer that is provided with a CPU, a ROM, a RAM and an I/O etc., and performs parking brake control by controlling rotation of the motor 10 in accordance with programs that are stored in the ROM etc. The EPB-ECU 9 corresponds to a vehicle brake control device of the present invention. The EPB-ECU 9, for example, inputs signals etc. in accordance with an operation state of an operation switch (SW) 23 that is provided in an instrument panel (not shown in the drawings) inside the vehicle cabin, and drives the motor 10 in accordance with the operation state of the operation SW 23. In addition, in accordance with a driving state of the motor 10, the EPB-ECU 9 outputs a signal to a lock/release display lamp 24 that is provided on the instrument panel, the signal indicating whether it is in a lock state or a release state.

More specifically, the EPB-ECU 9 has various functional portions to execute lock and release control, such as motor current detection to detect whether the electric current flowing in the motor 10 (the motor current) is on the upstream side or the downstream side of the motor 10, target motor current calculation to calculate a target motor current (a target current value) when ending lock control, judging whether or not the motor current has reached the target motor current, controlling the motor 10 based on the operation status of the operation SW 23, and so on. The EPB-ECU 9 performs control to lock and release the EPB 2 by causing the motor 10 to rotate in the positive direction or in the reverse direction or stopping the rotation of the motor 10, based on the status of the operation SW 23 and on the motor current.

Figure 4:
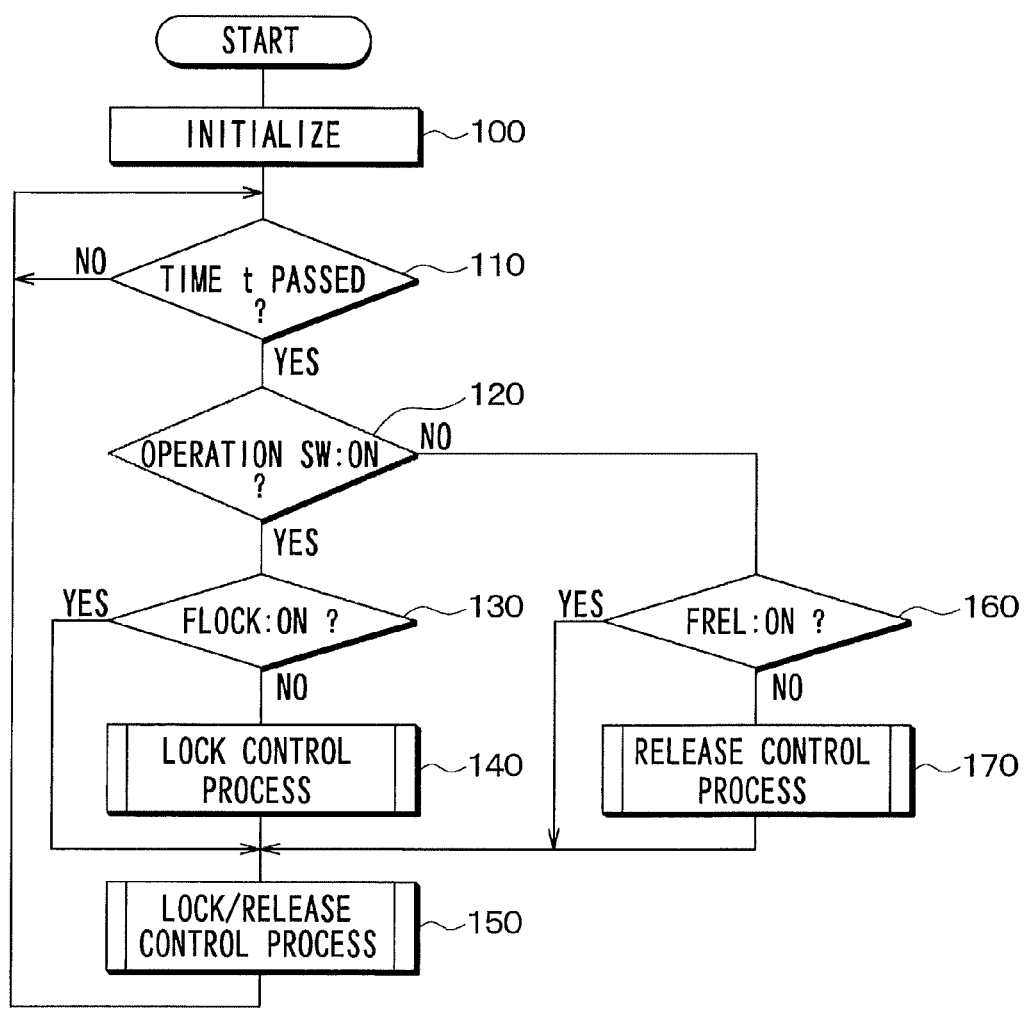
FIG. 4 is a flowchart showing parking brake control processing in detail.

Next, parking brake control will be explained which is executed by the EPB-ECU 9 in accordance with each of the above-described functional portions and the programs stored in the built-in ROM that is not shown in the drawings, using the brake system that is structured in the above-described manner. FIG. 4 is a flowchart showing parking brake control processing in detail.

First, after general initialization processing is performed, such as resetting a time period measuring counter and a flag etc. at step 100, the processing advances to step 110 and it is determined whether or not a time period t has elapsed. Here, the time period t is a time period that prescribes a control cycle. In other words, the determination at the present step is repeated until the time period t has elapsed from when the initialization processing is ended, or until the time period t has elapsed from when a positive determination is made at a previous time of the present step, and thus the parking brake control is executed each time the time period t elapses.

Next, at step 120, it is determined whether or not the operation SW 23 is on. An on state of the operation SW 23 means that the driver has operated the EPB 2 and intends to put the EPB 2 in a lock state, and an off state means that the driver intends to put the EPB 2 in a release state. For that reason, if a positive determination is made at the present step, the processing advances to step 130 and it is determined whether or not a lock state flag FLOCK is on. Here, the lock state flag FLOCK is a flag that is switched on when the EPB 2 is operated and is in the lock state, and when the lock state flag FLOCK is on, this is a state in which the operation of the EPB 2 is already complete and a desired braking force has been generated. Thus, the processing advances to the lock control processing at step 140 only when a negative determination is made here. When a positive determination is made, the processing advances to step 150, as the lock control processing is already complete.

Figure 5:
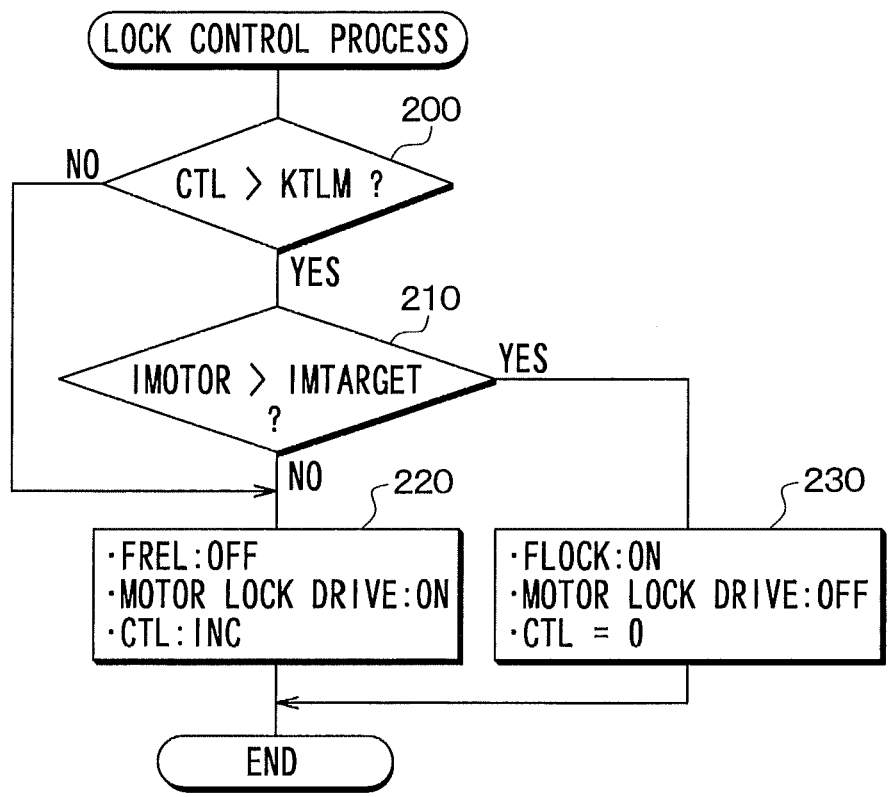
FIG. 5 is a flowchart showing lock control processing in detail.

In the lock control processing, processing is executed to perform a lock operation and a lock retention operation. In the lock operation, the EPB 2 is operated by causing the motor 10 to rotate, the desired braking force is generated by the EPB 2 and the wheel is thus locked, and in the lock retention operation, the rotation of the motor 10 is stopped at a position at which the wheel is locked, and that state is thus maintained. FIG. 5 shows a flowchart showing the lock control processing in detail, and the lock control processing will be explained with reference to FIG. 5.

First, at step 200, it is determined whether or not a lock control time counter CTL has exceeded a lock in-rush current mask time KTLM that has been decided in advance. The lock control time counter CTL is a counter that measures an elapsed time period from when lock control is started, and starts the count simultaneously with the start of the lock control processing. The lock in-rush current mask time KTLM is a time period to mask an in-rush current that occurs at a lock control start time. The lock in-rush current mask time KTLM is set to be a shorter time period than a minimum time period (200 ms, for example) that is assumed to be necessary for the lock control, and is decided in advance in accordance with a rotation speed of the motor 10 and so on. As in step 210 that will be explained later, when a motor current IMOTOR reaches a target motor current IMTARGET, it is determined that the braking force generated by the EPB 2 has reached, or is close to, a desired value, but it is possible that the motor current IMOTOR may exceed the target motor current IMTARGET due to the in-rush current at the start of supplying the current to the motor 10. For that reason, the control start time can be masked by comparing the lock control time counter CTL to the lock in-rush current mask time KTLM, and it is thus possible to inhibit a mistaken determination caused by the in-rush current or the like.

Therefore, if there is a state in which the lock control time counter CTL does not exceed the lock in-rush current mask time KTLM, the lock control is still to be continued, and thus the processing advances to step 220 and the lock operation is performed. Specifically, at the same time as switching off a release state flag, the lock control time counter CTL is incremented, and a motor lock drive is switched on, namely, the motor 10 is caused to rotate in the positive direction. In this way, the spur gear 15 is driven in accordance with the positive rotation of the motor 10, the spur gear 16 and the rotating shaft 17 rotate, and the propeller shaft 18 is moved to the side of the brake disc 12 due to the intermeshing of the male screw groove 17*a* and the female screw groove 18*a*. As a result, the piston 19 is also moved in the same direction and thus the brake pad 11 is moved to the side of the brake disc 12.

On the other hand, when a positive determination is made at step 200, the processing advances to step 210 and it is determined whether or not the motor current IMOTOR exceeds the target motor current IMTARGET at the time of the present control cycle. The motor current IMOTOR fluctuates depending on a load applied to the motor 10. In the case of the present embodiment, the load applied to the motor 10 corresponds to the pressing force with which the brake pad 11 is pressing the brake disc 12, and thus has a value corresponding to the pressing force that is generated by the motor current IMOTOR. Therefore, if the motor current IMOTOR exceeds the target motor current IMTARGET, a state is obtained in which the desired braking force is generated by the pressing force. Specifically, a state is obtained in which a frictional surface of the brake pad 11 is pressed by the EPB 2 against the inner wall surface of the brake disc 12 with a certain force. Thus, the processing of step 220 is repeated until the positive determination is made at the present step, and when the positive determination is made, the processing advances to step 230.

Then, at step 230, the lock state flag FLOCK, which means that the lock control is complete, is switched on. At the same time, the lock control time counter CTL is set to 0, and the motor lock drive is switched off (stopped) as the lock retention operation. In this way, the rotation of the motor 10 is stopped and the rotation of the rotating shaft 17 is stopped, and the propeller shaft 18 is retained in the same position as a result of the frictional force caused by the intermeshing of the male screw groove 17*a* and the female screw groove 18*a*, thus maintaining the braking force generated at that time. The movement of the vehicle during parking is restricted in this manner. The lock control processing is completed in this manner.

Meanwhile, when the negative determination is made at step 120 in FIG. 4, the processing advances to step 160, and it is determined whether or not a release state flag FREL is on. Here, the release state flag FREL is a flag that is switched on when the EPB 2 has been operated and is in a state of release, namely when the braking force generated by the EPB 2 is in a state of being released. When the release state flag FREL is on, this indicates a state in which the operation of the EPB 2 is already complete and the braking force has been released. Therefore, the processing advances to release control processing at step 170 only when a negative determination is made here, and when a positive determination is made, the processing advances to step 150 because the release control processing is already complete.

Figure 6:
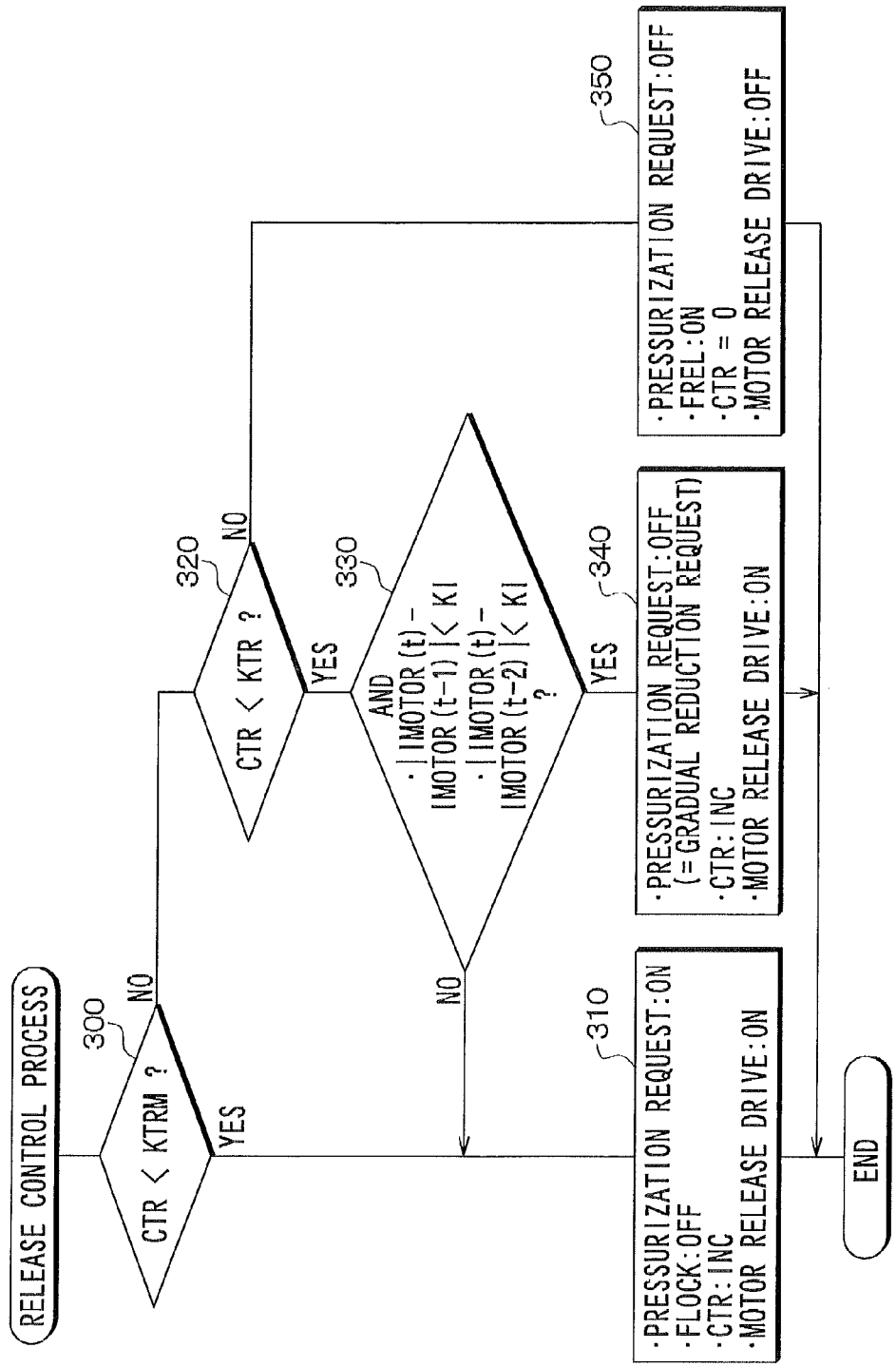
FIG. 6 is a flowchart showing release control processing in detail.

In the release control processing, processing to execute a release operation is performed to release the braking force being generated by the EPB-ECU 9 as a result of operating the EPB 2 by causing the motor 10 to rotate. FIG. 6 shows a flowchart showing the release control processing in detail, and the release control processing will be explained with reference to FIG. 6.

First, at step 300, it is determined whether or not a release control time counter CTR is less than a release in-rush current mask time KTRM that has been decided in advance. The release control time counter CTR is a counter that measures an elapsed time period from when the release control is started, and starts the count simultaneously with the start of the release control processing. The release in-rush current mask time KTRM is a time period to mask an in-rush current that occurs at the release control start time. The release in-rush current mask time KTRM is set to be a shorter time period than a minimum time period (200 ms, for example) that is assumed to be necessary for the release control, and is decided in advance in accordance with the rotation speed of the motor 10 and so on. As in step 330 that will be explained later, detection is performed to detect that the braking force becomes 0, based on a difference between a motor current IMOTOR (t−1) that was detected at the time of the previous control cycle and a motor current IMOTOR (t) that is detected at the time of the present cycle, and a difference between the motor current IMOTOR (t−1) that was detected at the time of the previous cycle and a motor current IMOTOR (t−2) that was detected one control cycle before the previous control cycle, namely, based on an absolute value of a differential value of the motor current IMOTOR. However, it is possible that the absolute value may fulfill conditions that cause the determination that the braking force is 0, due to the in-rush current at the start of supplying the current to the motor 10 or the like. For that reason, the control start time can be masked by comparing release control time counter CTR to the release in-rush current mask time KTRM, and it is thus possible to inhibit a mistaken determination caused by the in-rush current or the like.

Therefore, if there is a state in which the release control time counter CTR is less than the release in-rush current mask time KTRM, the release control is still to be continued, and thus the processing advances to step 310 and, at the same time as switching off a lock state flag, the release control time counter CTR is incremented, and a motor release drive is switched on, namely, the motor 10 is caused to rotate in the negative direction. In this way, the rotating shaft 17 is rotated in accordance with the negative rotation of the motor 10, and the propeller shaft 18 is moved in a direction to separate from the brake disc 12 due to the frictional force caused by the intermeshing of the male screw groove 17*a* and the female screw groove 18*a*. In this manner, the piston 19 and the brake pad 11 are also moved in the same direction.

Furthermore, at the same time as the above, a flag that indicates a pressurization request is switched on, the EPB-ECU 9 outputs a pressurization request signal to the ESC-ECU 8, and the deformation failure of the seal member 22 is corrected by performing the automatic pressurization of the W/C pressure. This effect will be explained with reference to FIG. 7.

Figure 7A:
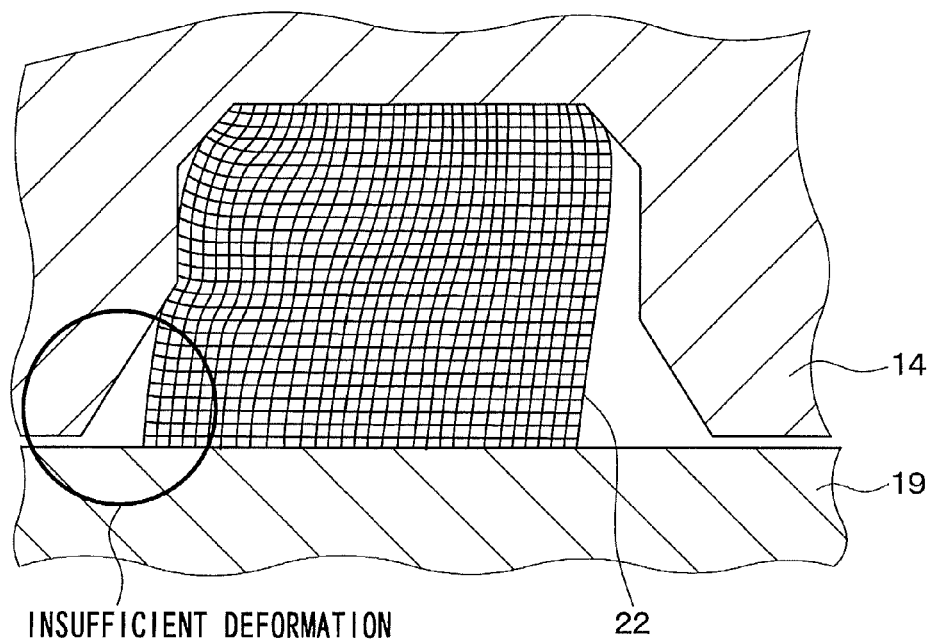
FIG. 7 (a) is diagram showing a state of a seal member 22 when lock control is performed in a state in which a W/C pressure is not generated by a service brake 1, and FIG. 7 (b) is a diagram showing a state of the seal member 22 when the W/C pressure is automatically increased as a result of a pressurization request.
Figure 7B:
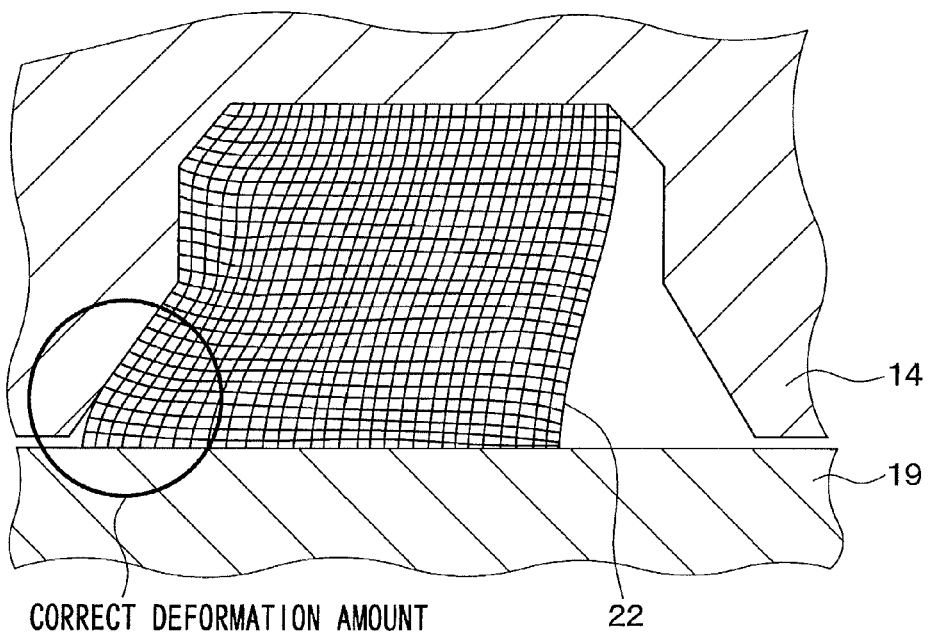

FIG. 7 (*a*) is a diagram showing a state of the seal member 22 when the lock control is performed in a state in which the W/C pressure is not being generated by the service brake 1, and FIG. 7 (*b*) is a diagram showing a state of the seal member 22 when the W/C pressure has been automatically increased as a result of the pressurization request.

At the time of lock control, if there is a state in which the driver depresses the brake pedal 3 and causes the W/C pressure to be generated by the service brake 1, based on that W/C pressure, the piston 19 applies a force to a side of the brake pad 11 such that the brake pad 11 comes into contact with the side of the brake disc 12. As a result, when applying the parking brake, the output of the motor 10 can also be reduced, and the W/C pressure is also applied to the seal member 22 via the gap between the piston 19 and the body 14, and thus the seal member 22 is caused to be deformed sufficiently.

However, in the case of a state in which the W/C pressure is not being generated by the service brake 1, the W/C pressure is not applied to the seal member 22 via the gap between the piston 19 and the body 14, and thus, as shown in FIG. 7 (a), the deformation of the seal member 22 is insufficient. In contrast to this, when the W/C pressure is generated by the automatic pressurization of the service brake 1 that uses the actuator 7, the W/C pressure is applied to the seal member 22 via the gap between the piston 19 and the body 14, as shown in FIG. 7 (b), the seal member 22 is caused to deform more, and thus, it is possible to correct the insufficient deformation of the seal member 22.

In the examples shown in FIGS. 7 (a) and (b), for example, a shape of a groove in which the seal member 22 is arranged is a tapered shape, and a deformation portion of the seal member 22 enters into the tapered portion and is more easily deformed. Compared to a small amount that enters into the tapered portion in the state shown in FIG. 7 (a), a larger amount enters into the tapered portion in the state shown in FIG. 7 (b). By the service brake 1 that uses the actuator 7 generating the W/C pressure using the automatic pressurization in this way, it is possible to correct the deformation failure of the seal member 22.

On the other hand, at step 300, when the release control time counter CTR is determined to be equal to or more than the release in-rush current mask time KTRM, the processing advances to step 320. At step 320, it is determined whether or not the release control time counter CTR is less than a release drive time KTR. By determining whether or not the release control time counter CTR, which indicates the time period from the start of the release control, has exceeded the release drive time KTR, it is possible to determine that the brake pad 11 has separated from the brake disc 12 by a predetermined distance. If a positive determination is made here, the processing advances to step 330.

Then, at step 330, it is determined whether or not the difference between the motor current IMOTOR (t−1) that was detected at the time of the previous control cycle and the motor current IMOTOR (t) that is detected at the time of the present cycle, and the difference between the motor current IMOTOR (t−1) that was detected at the time of the previous cycle and the motor current IMOTOR (t−2) that was detected one control cycle before the previous control cycle, namely, the absolute value of the differential value of the motor current IMOTOR, exceeds a threshold value KI (0.2 A, for example). As described above, the motor current IMOTOR is a value that depends on the load applied to the motor 10, and the load corresponds to the reactive force that is caused by the leading end of the propeller shaft 18 pushing the piston 19. Then, by the brake pad 11 being moved in the direction to separate from the brake disc 12 due to the release control, the force with which the leading end of the propeller shaft 18 pushes the piston 19 decreases, and thus the absolute value of the motor current IMOTOR gradually decreases. At that time, if the motor current IMOTOR that is flowing when the motor 10 is rotating in the negative direction is represented by a negative value, the motor current IMOTOR gradually increases. Therefore, by calculating the absolute value of the difference between the motor current IMOTOR (t−1) and the motor current IMOTOR (t), it is determined whether or not the motor load is currently fluctuating. Therefore, taking into account noise that is a factor in mistaken determination, the threshold value KI is set to be a value that is equal to or less than an amount of change in the motor current IMOTOR that is assumed for a fluctuation in the motor load due to the release control. When the absolute value of the differential value of the motor current IMOTOR continues to be equal to or less than the threshold value KI two times consecutively, it is determined that the motor load has gone and it is the instant at which the leading end of the propeller shaft 18 starts to separate from the piston 19.

For that reason, until a negative determination is made at step 330, the processing at step 310 is continuously executed, and when there is a positive determination at step 330, the processing advances to step 340. At step 340, the release control time counter CTR is incremented, and the motor release drive is switched on, namely, the motor 10 is caused to rotate in the negative direction. As a result of this, the same operation as that at step 310 is performed, and the brake pad 11 is moved until it has separated from the brake disc 12 by the predetermined distance. Further, at the same time, the pressurization request is switched off. In other words, the W/C pressure has been applied to the seal member 22 by the processing at step 310 and the deformation failure of the seal member 22 has already been corrected, and thus after that the automatic pressurization of the W/C pressure by the service brake 1 is released, and the piston 19 is moved along with the propeller shaft 18 in the direction to cause the brake pad 11 to separate from the brake disc 12.

After that, when the release drive time KTR elapses and a negative determination is made at step 320, the processing advances to step 350, and the release state flag FREL that means that the release is complete is switched on. At the same time, the release control time counter CTR is set to 0 and the motor release drive is switched off. As a result, the rotation of the motor 10 is stopped and, due to the frictional force caused by the intermeshing of the male screw groove 17a and the female screw groove 18a, the brake pad 11 is retained in a state in which it is separated from the brake disc 12. In this way, the release control processing is completed.

Figure 8:
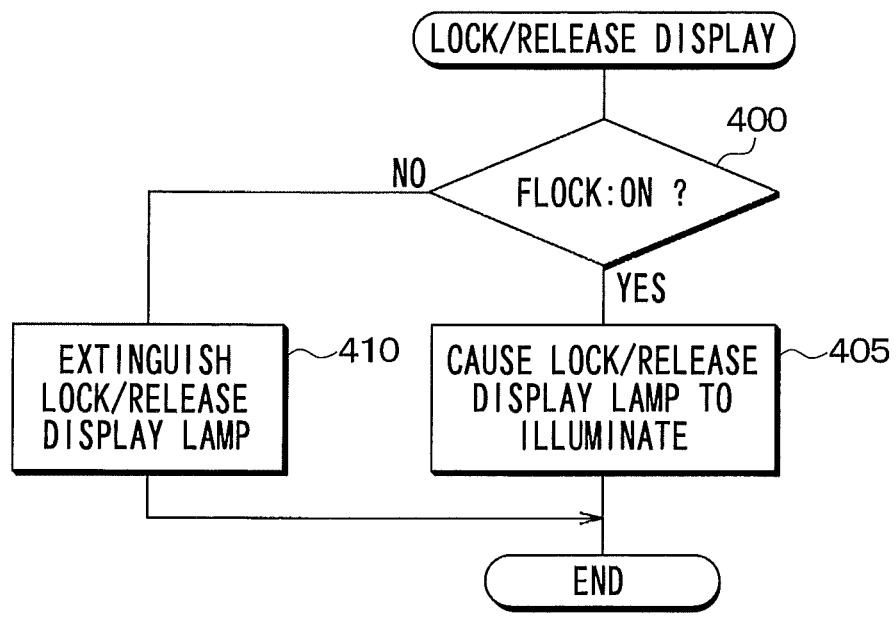
FIG. 8 is a flowchart showing lock/release display processing in detail.

When the lock control processing and the release control processing are complete in this way, the lock/release display processing at step 150 in FIG. 4 is performed. FIG. 8 shows a flowchart showing the lock/release display processing in detail, and the lock/release display processing will be explained with reference to FIG. 8.

At step 400, it is determined whether or not the lock state flag FLOCK is on. Here, if a positive determination is made here, the processing advances to step 405 and causes the lock/release display lamp 24 to illuminate. If a negative determination is made, the processing advances to step 410 and the lock/release display lamp 24 is extinguished. In this manner, the lock/release display lamp 24 is illuminated when in the lock state, and the lock/release display lamp 24 is extinguished when in the release state or when it is a state in which the release control has been started. In this way, it is possible to make the driver aware of whether or not it is the lock state. The lock/release display processing is complete in this manner and the parking brake control processing is accordingly complete.

FIG. 9 is a timing chart when the parking brake control processing is executed in the manner described above. As shown in this drawing, when the operation SW 23 is switched on and the lock control is started at a time point T1, the motor lock drive is switched on, the motor 10 is caused to rotate in the positive direction and the propeller shaft 18 is moved to the side of the brake pad 11. At the same time, the release state flag FREL is switched off.

Next, at a time point T2, because the lock control can be continued until the lock in-rush current mask time KTLM has elapsed, irrespective of the value of the motor current IMOTOR, the lock control is continued even if the in-rush current occurs. Then, after the lock in-rush current mask time KTLM has elapsed, at a time point T3, when the brake pad 11 and the brake disc 12 come into contact and there is no clearance between the brake pad 11 and the brake disc 12, the braking force is generated. In this way, the load on the motor 10 occurs and thus, the motor current IMOTOR rises. When, at a time point T4, the motor current IMOTOR reaches the target motor current IMTARGET, the motor lock drive is stopped. At the same time, the lock state flag FLOCK is switched on.

The lock control is performed in this manner and the desired braking force is generated by pushing the brake pad 11 against the brake disc 12.

Next, when the operation SW 23 is switched off and the release control is started at a time point T5, the motor release drive is switched on, the motor 10 is caused, to rotate in the negative direction and the propeller shaft 18 is moved to a side on which the brake pad 11 is separated from the brake disc 12. At the same time, the lock state flag FLOCK is switched off. Further, the flag indicating the pressurization request is switched on, and thus the W/C pressure is automatically increased. In this way, the W/C pressure is applied to the seal member 22 via the gap between the piston 19 and the body 14, thus further deforming the seal member 22 and the deformation failure of the seal member 22 can be corrected.

Next, because the release control can be continued until the release in-rush current mask time KTRM has elapsed, irrespective of the value of the motor current IMOTOR, the release control is continued even if the in-rush current occurs. Then, after the in-rush current has disappeared at a time point T6 and the release in-rush current mask time KTRM has also elapsed, if the difference between the motor current IMOTOR (t−1) that was detected at the time of the previous control cycle and the motor current IMOTOR (t) that is detected at the time of the present cycle, and the absolute value of the difference between the motor current IMOTOR (t−1) that was detected at the time of the previous cycle and the motor current IMOTOR (t−2) that was detected at the one control cycle before the previous control cycle are both equal to or less than the threshold value KI at a time point T7, this is considered to be the instant at which the leading end of the propeller shaft 18 starts to separate from the piston 19, and the motor drive is continued until the release control time KTR has elapsed. In this way, the brake pad 11 separates from the brake disc 12 and the clearance between the brake pad 11 and the brake disc 12 widens. After that, when the release control time KTR elapses, the motor release drive is stopped. At the same time, the release state flag FREL is switched on.

The release control is performed in this manner, a clearance of a predetermined distance is provided between the brake pad 11 and the brake disc 12, and a necessary clearance amount is secured.

As described above, in the present embodiment, at the time of the release control, immediately before the lock releasing, namely, immediately before the braking force of the EPB 2 generated by the propeller shaft 18 pressing the piston 19 is released, the W/C pressure is automatically increased, thus correcting the insufficient deformation of the seal member 22. Therefore, when pulling back the piston 19, it is possible to generate a large restoring force by the seal member 22, and the piston 19 can be pulled back based on the restoring force. As a result, the piston 19 is sufficiently moved and the insufficient pullback of the piston 19 can be inhibited. Further, the brake pad 11 can be separated from the brake disc 12 by the predetermined distance, and thus it is possible to inhibit a sense of drag of the brake from being imparted to the driver.

It should be noted that the lock releasing mentioned here means a timing at which the braking force of the EPB 2, which was being generated by the propeller shaft 18 pressing the piston 19, is released. This is a timing at which the propeller shaft 18 stops pressing the piston 19. In other words, it corresponds to a timing at which the positive determination at step 330 is made when the reactive force received by the propeller shaft 18 from the piston 19 becomes 0, and does not mean a timing at which the brake pad 11 separates from the brake disc 12 and the braking force becomes 0. Specifically, as in the present embodiment, in the case in which the W/C pressure is being generated by the automatic pressurization, at the instant at which the reactive force received by the propeller shaft 18 from the piston 19 becomes 0, the piston 19 is still pressed by the W/C pressure caused by the automatic pressurization, and the braking force is still being generated by the brake pad 11 being in contact with the brake disc 12. The braking force being generated at this time is not the braking force being generated by the EPB 2, but is the braking force generated by the automatic pressurization function of the service brake 1.

Other Embodiments (1) In the above-described embodiment the insufficient deformation of the seal member 22 is corrected by automatically increasing the W/C pressure immediately before the lock releasing at the time of the release control. However, the present invention is not limited to this example, and the correction of the insufficient deformation of the seal member 22 may be performed at any time point as long as it is before the end of the release operation by the release control. Namely, as long as the insufficient deformation of the seal member 22 is corrected in the release operation caused by the release control, the piston 19 can be pulled back using the restoring force of the seal member 22. Therefore, the insufficient deformation of the seal member 22 may be corrected at any time point, as long as it is before the end of the release operation by the release control.

However, it is preferable for the correction of the insufficient deformation of the seal member 22 to be performed before the lock releasing performed by the release control. This is because, although a force that is applied from the piston 19 to a contact surface of the seal member 22 is the same direction as a direction of deformation of the seal member 22 until the timing of the lock releasing performed by the release control, after the lock releasing, the force is in the opposite direction to the direction of deformation of the seal member 22. By doing this, when the W/C pressure is automatically increased, the insufficient deformation of the seal member 22 can be more reliably corrected.

Further, the correction of the insufficient deformation of the seal member 22 is not limited to being at the time of the release control, and may be executed immediately after the end of the lock operation in the lock control. In this way, when the correction of the insufficient deformation of the seal member 22 is performed at the time of the lock control, compared to a case in which the correction is performed at the time of the release control, it is not necessary to perform the automatic pressurization of the W/C pressure at the time of the release control, and the lock releasing can be performed more rapidly. Thus, it is possible to inhibit a release delay.

(2) In the above-described embodiment, the automatic pressurization of the W/C pressure is reliably performed in order to correct the insufficient deformation of the seal member 22. However, in a case such as when the driver performs the brake operation and the insufficient deformation of the seal member 22 is cancelled, it is not necessary to perform the correction of the insufficient deformation of the seal member 22. Thus, during a period from the start of the lock operation of the lock control, namely, a timing at which the braking force by the EPB 2 is started to be generated by the propeller shaft 18 pressing the piston 19, until the time of the lock releasing performed by the release control, it may be monitored whether or not the W/C pressure is equal to or more than a necessary fluid pressure at which it is necessary to perform the correction of the insufficient deformation of the seal member 22, and the correction of the insufficient deformation of the seal member 22 may be performed only when the W/C pressure is not equal to or more than the necessary fluid pressure. For example, as shown in FIG. 3, as well as providing a W/C pressure sensor 60, pressure detection means can be provided that detects the W/C pressure by inputting a detection signal from the W/C pressure sensor 60 to the EPB-ECU 9. When the W/C pressure is equal to or more than the necessary fluid pressure at which it is necessary to perform the correction of the insufficient deformation of the seal member 22, a history of that may be stored and it can be determined whether or not it is necessary to perform the correction of the insufficient deformation of the seal member 22 based on the history.

In particular, as in the above-described embodiment, when the correction of the insufficient deformation of the seal member 22 is performed immediately before the lock releasing in the release control, as there are many cases in which the driver performs the brake operation at the time of the release operation, there are many cases in which it is not necessary to perform the correction of the insufficient deformation of the seal member 22. Thus, by monitoring whether the W/C pressure is equal to or more than the necessary fluid pressure, it becomes possible to reduce an operation frequency of the actuator 7 in order to perform the automatic pressurization to correct the insufficient deformation of the seal member 22.

Furthermore, the necessary fluid pressure may be changed at this time. Specifically, depending on wear etc. of the brake pad 11, an amount of movement of the piston 19 changes, and a degree of the insufficient deformation of the seal member 22 changes in accordance with that. Therefore, if a position after movement of the piston 19 in the lock control is estimated by using movement position estimation means, such as a stroke sensor, and the necessary fluid pressure is changed in accordance with the position after movement, it is possible to determine whether or not there is an insufficient deformation of the seal member 22 in accordance with the change in the movement amount of the piston 19 at the time of locking.

In addition, an increased fluid pressure of the W/C pressure which is a result of the automatic pressurization function of the service brake 1 may be set based on the estimated position after movement of the piston 19 at that time. Specifically, design of the seal member 22 is performed such that a deformation amount of the seal member 22 corresponds to the W/C pressure. Then, in accordance with the change in the position after movement of the piston 19, the W/C pressure also changes to a pressure necessary to move the piston 19 to the position after movement at the time of normal braking, namely, braking by the driver depressing the brake pedal 3. As a result, if the W/C pressure necessary to move the piston 19 to the position after movement is changed in accordance with the position after movement of the piston 19, the amount of deformation of the seal member 22 also changes. Thus, by setting the increased fluid pressure of the W/C pressure in accordance with the position after movement of the piston 19, it is possible to appropriately set the increased fluid pressure that is necessary to correct the insufficient deformation of the seal member 22.

In this case, the increased fluid pressure of the W/C pressure can be set, for example, to a fluid pressure at which the brake pad 11 can be further moved in the direction in which the brake pad 11 is caused to come into contact with the brake disc 12, from the position after movement of the piston 19 when the brake pad 11 has been caused to come into contact with the brake disc 12 and the wheel has been locked. By doing this, it is possible to create a situation in which the W/C pressure is generated that is equal to or more than the W/C pressure necessary to move the piston 19 to a point at which the brake pad 11 comes into contact with the brake disc 12 at the time of normal braking. As a result, the insufficient deformation of the seal member 22 can be reliably corrected.

Further, the fluid pressure, at which it is possible to correct the deformation failure of the seal member 22, may be determined in advance by experimentation etc. and the fluid pressure which is calculated in advance and at which the deformation failure can be corrected may be generated as the W/C pressure. In this way, by determining, in advance, the fluid pressure at which the deformation failure can be corrected, an unnecessarily large fluid pressure need not be generated, and it is thus possible to reduce an operation noise and an operation time of the actuator 7.

(3) When performing the automatic pressurization of the W/C pressure to correct the insufficient deformation of the seal member 22 as in the above-described embodiment, the motor 10 may be driven at the same time such that the piston 19 is moved in the direction to cause the brake pad 11 to come into contact with the brake disc 12. By moving the piston 19 simultaneously with the automatic pressurization in this way, it is possible to generate the force, on the contact surface of the seal member 22 with the piston 19, in the direction in which the seal member 22 is wished to be deformed. It is thus possible to more reliably correct the insufficient deformation of the seal member 22.

(4) In the above-described embodiment, the pressurization request is switched off at step 340. In this case, differential pressure control valves 33 and 43 are caused to be in a communication state such that the differential pressure between the differential pressure control valves 33 and 43 is 0. At the same time, the driving of the motor 50 is stopped, and thus, the W/C pressure is sharply lowered. However, if the W/C pressure is sharply lowered, the piston 19 momentarily moves due to the pressure fluctuation and collides with the propeller shaft 18, and this can cause problems such as the occurrence of noise, or placing an excessive load on the EPB 2. Further, because the differential pressure control valves 33 and 43 are in the communication state when the W/C pressure is lowered, the W/C pressure is transmitted to the M/C 5 side, and a problem can occur, such as a reactive force resulting from this being conveyed to the driver via the brake pedal 3.

For that reason, in the processing at step 340 in FIG. 6, in addition to switching off the pressurization request, a flag can be switched on that indicates a gradual reduction request, such as shown in brackets in step 340. When this gradual reduction request is output, the W/C pressure can be gradually reduced by the ESC-ECU 8 lowering the current value flowing to the solenoids of the differential pressure control valves 33 and 43 by a predetermined gradient, such that the above-described problem does not occur.

(5) In the above-described embodiment, as shown in FIG. 2, the explanation is given for the case in which the brake structure is applied that is formed by the combination of the EPB 2 and the service brake 1, which can generate the braking force by the parking brake by driving the motor 10. However, this is simply one example, and another structure may be adopted. For example, with the brake structure in which a wire is pulled by the driver pulling a parking lever and the rotating shaft 17 is caused to rotate to drive the propeller shaft 18, the same effects as those of the above-described embodiments can be obtained by performing the automatic pressurization of the W/C pressure to correct the insufficient deformation of the seal member 22 using the automatic pressurization function of the service brake 1.

(6) In the above-described embodiment, the disk brake type EPB 2 is given as the example, but the EPB 2 may be another type, such as a drum brake type, for example. In this case, the friction material and the friction-applied material are a brake shoe and a brake drum, respectively.

(7) In the above-described embodiment, the electronic control means is formed to include the two ECUs, namely the ESC-ECU 8 and the EPB-ECU 9, but this may be an integrated single ECU, or each of the above-described processing may be performed by another ECU.

REFERENCE SIGNS LIST

1 Service brake
2 EPB
5 M/C
7 Actuator
8 ESC-ECU
9 EPB-ECU
10 Motor
11 Brake pad
12 Brake disc
13 Caliper
14 Body
14a Hollow portion
14b Passage
17 Rotating shaft
17a Male screw groove
18 Propeller shaft
18a Female screw groove
19 Piston
22 Seal member
23 Operation SW
31, 32, 41, 42 W/C
60 W/C pressure sensor

The invention claimed is:

1. A vehicle brake control device comprising:
a friction material;
a friction-applied material to which friction is applied, the friction-applied material being attached to a wheel;
a parking brake that mechanically generates a braking force using the friction material and the friction-applied material;
a service brake that generates a braking force by hydraulic pressure using the friction material and the friction-applied material; and
electronic control means for controlling operation of the parking brake and the service brake,
wherein
the parking brake has a parking brake mechanism that performs a lock operation in which a pressing member is mechanically moved based on an operation of a driver by a moving member that moves in a direction in which the friction material comes into contact with the friction-applied material, and the friction material is moved and pressed against the friction-applied material by the pressing member, a lock retention operation in which a pressed state is retained, and a release operation in which the pressing member is moved and the friction material is separated from the friction-applied material by moving the moving member in a direction in which the friction material is separated from the friction-applied material and,
the service brake has brake fluid pressure generation means for generating a brake fluid pressure, a wheel cylinder, which is coupled to the brake fluid pressure generation means, which, caused by an increase in the brake fluid pressure, moves and presses the friction material in a direction to come into contact with the friction-applied material by using the pressing member that is shared with the parking brake, and which, caused by a decrease in the brake fluid pressure, moves the friction material in a direction to separate from the friction-applied material by using the pressing member, and brake fluid pressure adjustment means that is able to adjust the brake fluid pressure of the wheel cylinder,
the wheel cylinder is structured to include a cylinder shaped body having a hollow portion in which the pressing member and the moving member are housed and also to include a seal member between the body and the pressing member, and
within a time period from a start of the lock operation to an end of the release operation, the electronic control means automatically increases, by using the brake fluid pressure adjustment means, a wheel cylinder pressure that is the brake fluid pressure inside the wheel cylinder and performs deformation amount correction pressurization to correct an amount of deformation of the seal member by applying the increased fluid pressure to the seal member within the time period from the start of the lock operation to the end of the release operation, the electronic control means completes the release operation of the parking brake after releasing of automatic increase of the wheel cylinder pressure caused by the brake fluid pressure adjustment means is completed, the automatic increase being for the deformation amount correction pressurization.

2. The vehicle brake control device according to claim 1, wherein the electronic control means has pressure detection means for detecting the wheel cylinder pressure and, based on detection results of the pressure detection means, performs the deformation amount correction pressurization when the wheel cylinder pressure that is equal to or more than a pre-set necessary fluid pressure is not generated within a time period from the start of the lock operation to a start of the release operation.

3. The vehicle brake control device according to claim 2, wherein the electronic control means has movement position estimation means for estimating a position after movement of the pressing member, and changes the necessary fluid pressure in accordance with the estimated position after movement.

4. The vehicle brake control device according to claim 3, wherein the electronic control means sets the increased fluid pressure being result of the deformation amount in accordance with the position after movement estimated by the movement position estimation means.

5. The vehicle brake control device according to claim 4, wherein the electronic control means sets the increased fluid pressure being result of the deformation amount to a fluid pressure at which the friction material can be moved further from the position after movement of the pressing member at a time of the lock retention operation toward a side of contact with the friction-applied material.

6. The vehicle brake control device according to claim 1, wherein the electronic control means sets, as the increased fluid pressure, a pressure that is set in advance as a pressure that is capable of correcting a deformation failure of the seal member.

7. The vehicle brake control device according to claim 1, wherein the electronic control means performs the deformation amount correction pressurization before a lock releasing in which the braking force generated by the parking brake is released by the release operation.

8. The vehicle brake control device according to claim 7, wherein the electronic control means executes the deformation amount correction pressurization at an end of the lock operation.

9. The vehicle brake control device according to claim 7, wherein the electronic control means executes the deformation amount correction pressurization in the release operation before the lock releasing.

10. The vehicle brake control device according to claim 7, wherein the parking brake is an electric parking brake that has an electric drive source which uses the moving member to move the pressing member in accordance with a command from the electronic control means, and when executing the deformation amount correction pressurization, the electronic control means, using the electric parking brake, uses the moving member to move the pressing member in a direction to a side on which the friction material comes into contact with the friction-applied material.

\* \* \* \* \*